US010932146B2

(12) United States Patent
Van Phan et al.

(10) Patent No.: US 10,932,146 B2
(45) Date of Patent: Feb. 23, 2021

(54) MANAGING CELL CLUSTER IN SERVING USER EQUIPMENT

(71) Applicant: Nokia Technologies Oy, Espoo (FI)

(72) Inventors: Vinh Van Phan, Oulu (FI); Ling Yu, Kauniainen (FI); Peter Rost, Heidelberg (DE)

(73) Assignee: Nokia Technologies Oy, Espoo (FI)

( * ) Notice: Subject to any disclaimer, the term of this patent is extended or adjusted under 35 U.S.C. 154(b) by 296 days.

(21) Appl. No.: 16/310,860

(22) PCT Filed: Jun. 14, 2017

(86) PCT No.: PCT/IB2017/053541
§ 371 (c)(1),
(2) Date: Dec. 18, 2018

(87) PCT Pub. No.: WO2017/221114
PCT Pub. Date: Dec. 28, 2017

(65) Prior Publication Data
US 2020/0314670 A1 Oct. 1, 2020

Related U.S. Application Data

(60) Provisional application No. 62/353,851, filed on Jun. 23, 2016.

(51) Int. Cl.
H04W 4/00 (2018.01)
H04W 24/08 (2009.01)
(Continued)

(52) U.S. Cl.
CPC ....... *H04W 24/08* (2013.01); *H04W 36/0094* (2013.01); *H04W 36/28* (2013.01); *H04W 76/15* (2018.02)

(58) Field of Classification Search
CPC . H04W 24/08; H04W 76/15; H04W 36/0094; H04W 36/28; H04W 36/0069
(Continued)

(56) References Cited

U.S. PATENT DOCUMENTS

2006/0172759 A1   8/2006   Ishihara
2013/0267221 A1*  10/2013  Srinivasan ........ H04W 36/0085
                                                        455/422.1
(Continued)

FOREIGN PATENT DOCUMENTS

JP   2015514377 A   5/2015
JP   2015185955 A   10/2015

OTHER PUBLICATIONS

Extended European Search Report received for corresponding European Patent Application No. 17814843.3, dated Nov. 21, 2019, 9 pages.
(Continued)

Primary Examiner — Marcos Batista
(74) Attorney, Agent, or Firm — Nokia Technologies Oy

(57) ABSTRACT

Various communication systems may benefit from improved network management. A method may include receiving an indication of a subset of a cluster of local cells at an ultra-reliable, low latency communications user equipment using multi-connectivity. The method may also include receiving rules for radio performance monitoring, wherein the rules include a packet error rate threshold for individual radio links of the multi-connectivity. In addition, the method may include determining based on the rules and the radio performance monitoring whether to skip the monitoring of one or more cells of the subset of local cells. The skip may be short-term or long term. Further, the method may include communicating to the subset a report based on the radio
(Continued)

performance monitoring and whether to skip the monitoring of one or more cells of the subset of local cells.

20 Claims, 4 Drawing Sheets

(51) Int. Cl.
  *H04W 76/15* (2018.01)
  *H04W 36/00* (2009.01)
  *H04W 36/28* (2009.01)
(58) Field of Classification Search
  USPC .................. 370/329, 330, 331, 341, 437; 455/450–452.1, 464
  See application file for complete search history.

(56) References Cited

U.S. PATENT DOCUMENTS

| | | | |
|---|---|---|---|
| 2014/0056243 A1* | 2/2014 | Pelletier ............ | H04W 72/1268 370/329 |
| 2015/0201368 A1 | 7/2015 | Cudak et al. | |
| 2015/0263836 A1 | 9/2015 | Kim | |

OTHER PUBLICATIONS

"Support for Ultra-Reliable Low Latency Communication (URLLC)", 3GPP TSG-RAN2 Meeting #94, R2-164130, Huawei, Agenda Item: 9.4.3.2.5, May 23-27, 2016,, 3 pages.

"Discussion on Beam Measurement for 5G New Radio Interface in mmWave Frequency Bands", 3GPP TSG-RAN NG2 Meeting #94, R2-163652, Samsung, Agenda Item: 9.5.1, May 23-27, 2016, pp. 1-4.

Office action received for corresponding Japanese Patent Application No. 2018-567133, dated Nov. 26, 2019, 2 pages of office action and 2 pages of translation available.

"Multi-Connectivity Considerations for New Radio", 3GPP TSG-RAN WG2 Meeting #93bis, R2-162499, Nokia, Agenda Item: 9.2, Apr. 11-15, 2016, 3 pages.

"Collecting Mobility Statistics in Support of Configuration and Optimisation of LTE/SAE Networks", 3GPP TSG-RAN WG3 Meeting #55bis, R3-070660, Mitsubishi Electric, Agenda Item: 7.15, Mar. 27-30, 2007, pp. 1-3.

"3rd Generation Partnership Project; Technical Specification Group Services and System Aspects; Feasibility Study on New Services and Markets Technology Enablers; Stage 1(Release 14)", 3GPP TR 22.891 V14.0.0, Mar. 2016, pp. 1-82.

"3rd Generation Partnership Project; Technical Specification Group Radio Access Network; Study on Scenarios and Requirements for Next Generation Access Technologies; (Release 14)", 3GPP TR 38.913 V0.3.0, Mar. 2016, pp. 1-30.

International Search Report and Written Opinion received for corresponding Patent Cooperation Treaty Application No. PCT/IB2017/053541, dated Jul. 24, 2017, 10 pages.

Ishikura et al., "Multi Connection TCP Mechanism for High Performance Transport in an ATM Network", Proceedings of the International IFIP-IEEE Conference on Broadband Communications, Global Infrastructure for the Information Age, Apr. 23-25, 1996, 443-454.

"Multiple Connections for Transmission Reliability", 3GPP TSG-RAN WG2 Meeting #93bis, R2-162567, CATT, Agenda Item: 9.3.2, Apr. 11-15, 2016, pp. 1-5.

"Support for Ultra-Reliable Low Latency Communication", 3GPP TSG RAN WG3 Meeting #93, R3-161778, ZTE, Agenda item: 10.1.2, Aug. 22-26, 2016, pp. 1-3.

\* cited by examiner

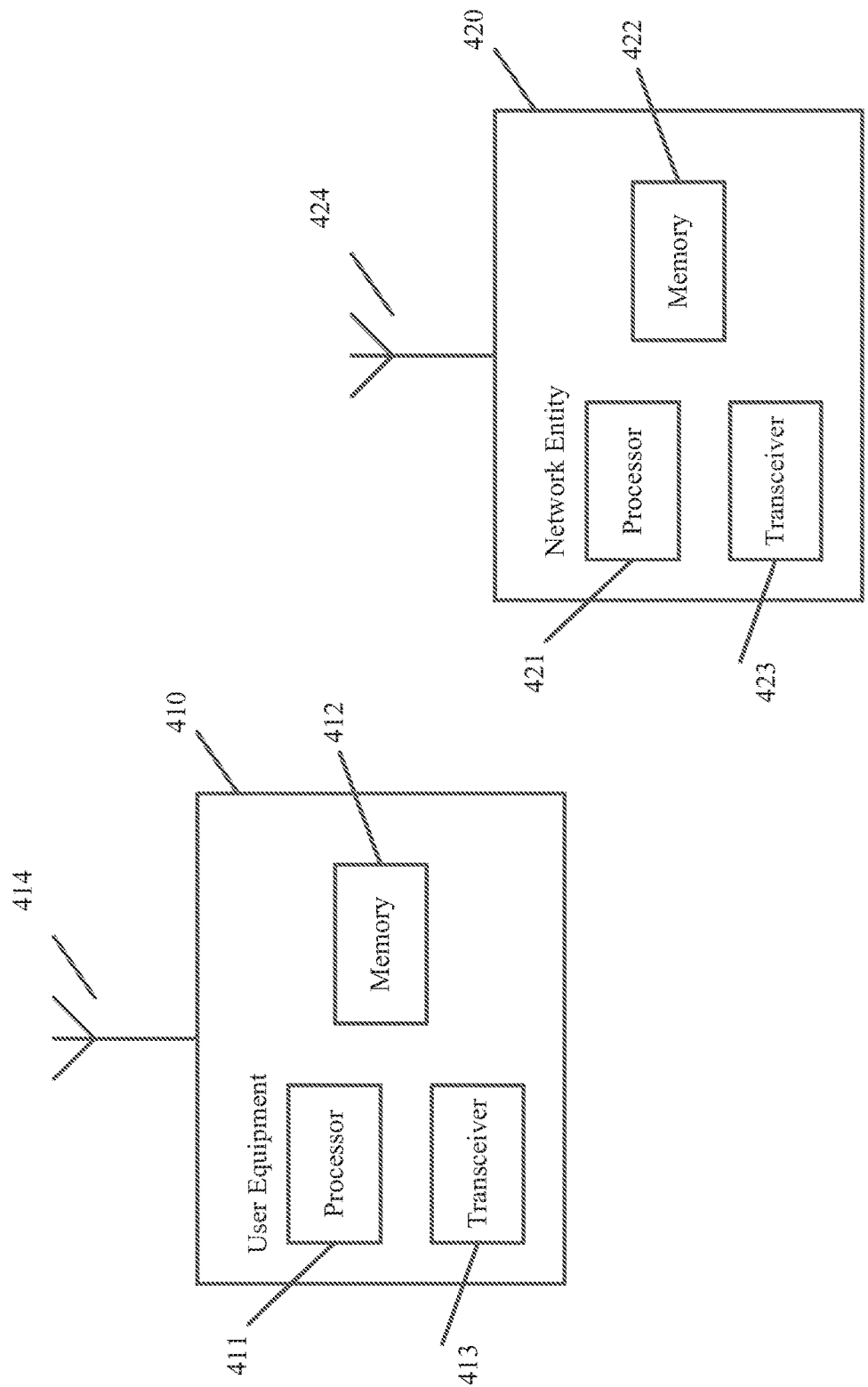

MANAGING CELL CLUSTER IN SERVING USER EQUIPMENT

CROSS REFERENCE TO RELATED APPLICATION

Related Application

This application was originally filed as Patent Cooperation Treaty Application No. PCT/IB2017/053541 filed Jun. 14, 2017 which claims priority benefit to U.S. Provisional Patent Application No. 62/353,851, filed Jun. 23, 2016.

BACKGROUND

Field

Various communication systems may benefit from improved network management. For example, communication systems may benefit from improved management of cells serving a user equipment in ultra-reliable and low latency communications.

Description of the Related Art

Third generation partnership project (3GPP) $5^{th}$ generation (5G) technology is a new generation of radio systems and network architecture that can deliver extreme broadband and ultra-robust, low latency connectivity. 5G can improve the telecommunication services offered to the end users, and help support massive machine-to-machine (M2M) communications. 5G may also provide support for ultra-reliable, low latency communications (URLLC). URLLC may be used, for example, for industrial control, tactile internet, vehicular safety, transport system efficiency, and eHealth applications.

URLLC is one of three main classified families of usage scenarios to be supported by next generation networks, such as 5G, International Mobile Telecommunications (IMT) 2020, or beyond. According to 3GPP TR 38.913, key performance indicators (KPI) related to URLLC aim to achieve a user plane latency of 0.5 milliseconds (ms) for an uplink transmission, and 0.5 ms for a downlink transmission. 3GPP TR 38.913, "Study on Scenarios and Requirements for Next Generation Access Technologies," is hereby incorporated in its entirety. The target latency should also be low enough to support wireless transport technology that can be used with next generation access architecture.

User plane latency may be determined based on the time it takes to successfully deliver an application layer packet or message from the radio protocol layer 2/3 service data unit (SDU) ingress point to the radio protocol layer 2/3 SDU egress point via a radio interface in both uplink (UL) and downlink (DL) channels. The reception of packets or data in a device, user equipment, or base station may, in some embodiments, not be restricted by discontinuous reception (DRX). For reliability KPI related to URLLC, the network aims to achieve reliability of up to $1 \times 10^{-5}$ packet error rate within 1 ms in certain use cases, such as eHealth surgical robots operating in indoor environments. A packet error rate may be the probability of successfully transmitting a data packet of X number of bytes. This reliability performance may be supported together with a user experienced data rate in the order of 300 megabits per second (Mops).

Given the above KPI that a URLLC aims to achieve, even if a transmission time interval (TTI) and round-trip time (RTT) are reduced to 0.1 ms in future radio technologies for fastest layer 1 (L1) or layer 2 (L2) retransmissions, not many retransmissions are affordable within a 0.5 ms user plane latency. In addition, in a short time interval of 0.5 ms, radio channel errors may be highly correlated. This can be known as the large-scale fading effect. As such, a retransmission within 0.5 ms on the same radio channel or carrier may fail.

To ensure that the probability of successful packet transmissions with a single transmission attempt can be maintained above a target level for URLLC, a robust modulation and coding scheme (MCS) may be adopted in a semi-persistent way, rather than a dynamic pre-packet adaptation for URLLC. Higher layer transmissions, including those transmissions above L1 and L2 MAC, may also not be applicable due to excessive RTT that does not achieve a 0.5 ms user plane latency.

SUMMARY

A method may include receiving an indication of a subset of a cluster of local cells at an ultra-reliable, low latency communications user equipment using multi-connectivity. The method may also include receiving at least one rule for radio performance monitoring. The at least one rule may include a packet error rate threshold for individual radio links of the multi-connectivity. In addition, the method may include determining based on the at least one rule for radio performance monitoring whether to skip monitoring of one or more cells of the subset of local cells. The skip may be a short-term skip or a long-term skip. Further, the method may include communicating to the subset a report based on the radio performance monitoring and whether to skip monitoring of one of more cells of the subset of local cells.

According to certain embodiments, an apparatus may include at least one memory including computer program code, and at least one processor. The at least one memory and the computer program code may be configured, with the at least one processor, at least to receive an indication of a subset of a cluster of local cells at an ultra-reliable, low latency communications user equipment using multi-connectivity. The at least one memory and the computer program code may also be configured, with the at least one processor, at least to receive at least one rule for radio performance monitoring. The at least one rule may include a packet error rate threshold for individual radio links of the multi-connectivity. In addition, the at least one memory and the computer program code may also be configured, with the at least one processor, at least to determine based on the at least one rule for radio performance monitoring whether to skip monitoring of one or more cells of the subset of local cells. The skip may be a short-term skip or a long-term skip. Further, the at least one memory and the computer program code may be configured, with the at least one processor, at least to communicate to the subset a report based on the radio performance monitoring and whether to skip monitoring of one of more cells of the subset of local cells.

An apparatus, in certain embodiments, may include means for receiving an indication of a subset of a cluster of local cells at an ultra-reliable, low latency communications user equipment using multi-connectivity. The apparatus may also include means for receiving at least one rule for radio performance monitoring. The at least one rule may include a packet error rate threshold for individual radio links of the multi-connectivity. In addition, the apparatus may means for determining based on the at least one rule for radio performance monitoring whether to skip monitoring of one or more cells of the subset of local cells. The skip may be a short-term skip or a long-term skip. Further, the method may include communicating to the subset a report based on the radio performance monitoring and whether to skip monitoring of one of more cells of the subset of local cells.

According to certain embodiments, a non-transitory computer readable medium encoding instructions that, when executed in hardware, perform a process. The process may include receiving an indication of a subset of a cluster of local cells at an ultra-reliable, low latency communications user equipment using multi-connectivity. The process may also include receiving at least one rule for radio performance monitoring. The at least one rule may include a packet error rate threshold for individual radio links of the multi-connectivity. In addition, the process may include determining based on the at least one rule for radio performance monitoring whether to skip monitoring of one or more cells of the subset of local cells. The skip may be a short-term skip or a long-term skip. Further, the process may include communicating to the subset a report based on the radio performance monitoring and whether to skip monitoring of one of more cells of the subset of local cells.

According to certain embodiments, a computer program product encoding instructions for performing a process according to a method including receiving an indication of a subset of a cluster of local cells at an ultra-reliable, low latency communications user equipment using multi-connectivity. The method may also include receiving at least one rule for radio performance monitoring. The at least one rule may include a packet error rate threshold for individual radio links of the multi-connectivity. In addition, the method may include determining based on the at least one rule for radio performance monitoring whether to skip monitoring of one or more cells of the subset of local cells. The skip may be a short-term skip or a long-term skip. Further, the method may include communicating to the subset a report based on the radio performance monitoring and whether to skip monitoring of one of more cells of the subset of local cells.

A method may include determining a subset of a cluster of local cells and at least one rule for radio performance monitoring at a network entity. The at least one rule includes a packet error rate threshold for individual radio links. The method may also include transmitting to an ultra-reliable, low latency communications user equipment using multi-connectivity having individual radio links the indication of the subset and the rules. In addition, the method can also include receiving a report based on the radio performance monitoring and an indication of whether to skip monitoring one or more cells of the subset of local cells. The skip may be short-term or long-term.

According to certain embodiments, an apparatus may include at least one memory including computer program code, and at least one processor. The at least one memory and the computer program code may be configured, with the at least one processor, at least to determine a subset of a cluster of local cells and at least one rule for radio performance monitoring at a network entity. The at least one rule includes a packet error rate threshold for individual radio links. The at least one memory and the computer program code may also be configured, with the at least one processor, at least to transmit to an ultra-reliable, low latency communications user equipment using multi-connectivity having individual radio links the indication of the subset and the rules. In addition, the at least one memory and the computer program code may also be configured, with the at least one processor, at least to receive a report based on the radio performance monitoring and an indication of whether to skip monitoring one or more cells of the subset of local cells. The skip may be short-term or long-term.

An apparatus, in certain embodiments, may include means for determining a subset of a cluster of local cells and at least one rule for radio performance monitoring at a network entity. The at least one rule includes a packet error rate threshold for individual radio links. The apparatus may also include means for transmitting to an ultra-reliable, low latency communications user equipment using multi-connectivity having individual radio links the indication of the subset and the rules. In addition, the apparatus may means for include receiving a report based on the radio performance monitoring and an indication of whether to skip monitoring one or more cells of the subset of local cells. The skip may be short-term or long-term.

According to certain embodiments, a non-transitory computer readable medium encoding instructions that, when executed in hardware, perform a process. The process may include determining a subset of a cluster of local cells and at least one rule for radio performance monitoring at a network entity. The at least one rule includes a packet error rate threshold for individual radio links. The process may also include transmitting to an ultra-reliable, low latency communications user equipment using multi-connectivity having individual radio links the indication of the subset and the rules. In addition, the process may include receiving a report based on the radio performance monitoring and an indication of whether to skip monitoring one or more cells of the subset of local cells. The skip may be short-term or long-term.

According to certain embodiments, a computer program product encoding instructions for performing a process according to a method including determining a subset of a cluster of local cells and at least one rule for radio performance monitoring at a network entity. The at least one rule includes a packet error rate threshold for individual radio links. The method may also include transmitting to an ultra-reliable, low latency communications user equipment using multi-connectivity having individual radio links the indication of the subset and the rules. In addition, the method may include receiving a report based on the radio performance monitoring and an indication of whether to skip monitoring one or more cells of the subset of local cells. The skip may be short-term or long-term.

BRIEF DESCRIPTION OF THE DRAWINGS

For proper understanding of the invention, reference should be made to the accompanying drawings, wherein:

FIG. 4 illustrates a system according to certain embodiments.

DETAILED DESCRIPTION

Figure 1:
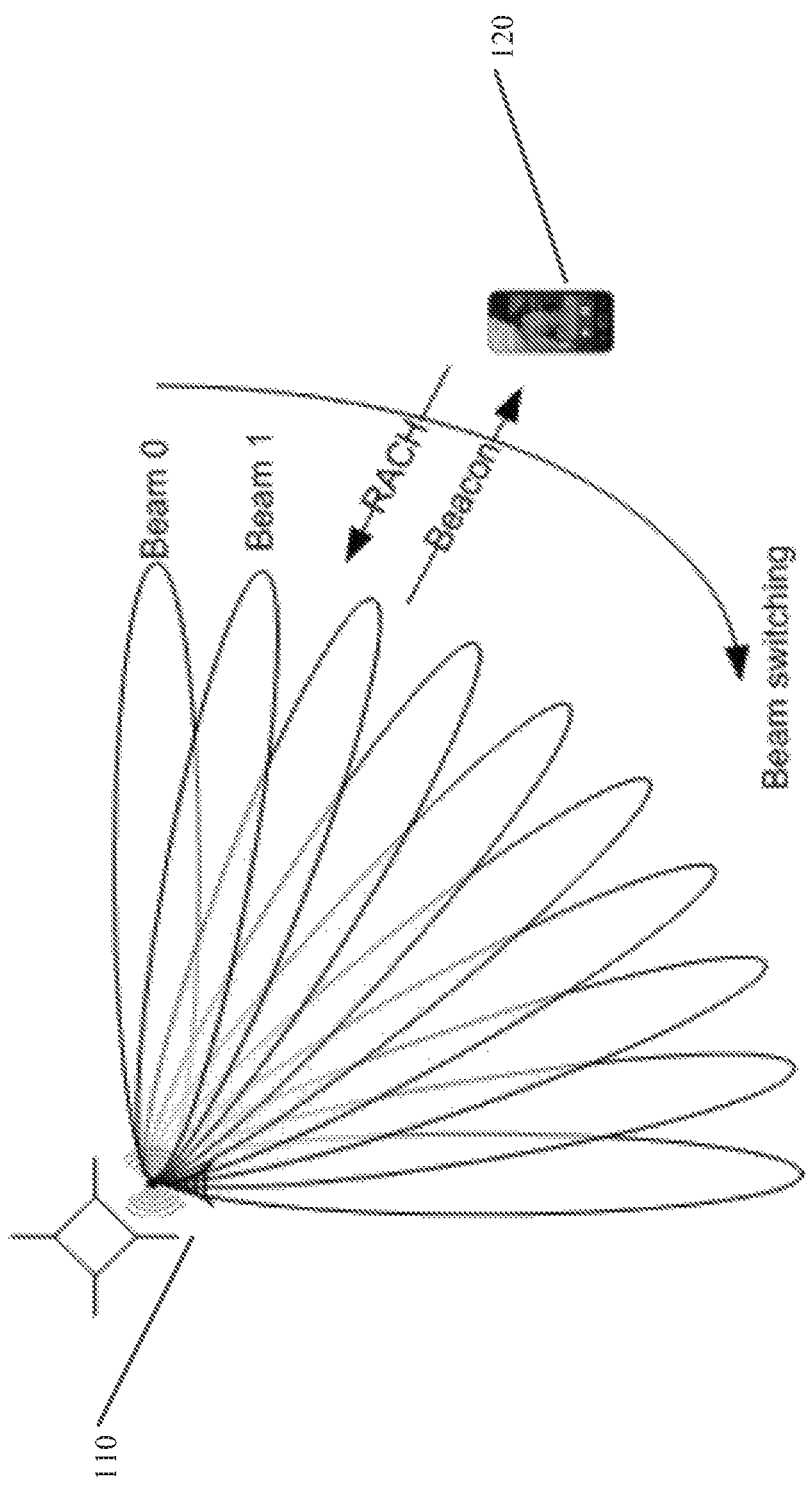
FIG. 1 illustrates a beam switching in a 5G network.

In certain embodiments, multi-connectivity (MC) with a number of serving base stations, for example, eNodeB (eNB) or access points, may be used. The URLLC UE may use MC to send the same packet or data once, without retransmission, to a subset of a cell cluster of serving base stations. The use of MC can allow the UE to achieve the target user latency of 0.5 ms, or to meet any other KPIs of URLLC. Some embodiments may also be used in a macro-diversity combining (MDC) embodiment offered by MC in 5G ultra-dense networks (UDN). In UDN, the UE may be served by a cell cluster of up to a certain number of cells or base stations, for example ten cells or base stations. The UE can identify the number of base stations in its proximity at a certain location and/or time.

Certain embodiments can provide a method, apparatus, means for, or a computer product for managing a subset of a cluster of local cells for a URLLC UE. This management may help to improve the efficiency of the URLLC UE, and ensure that resource consumption, such as radio spectrum or power energy, from both the network and UE sides can be minimized. For example, managing the URLLC UE may allow for reduced resource consumption caused by redundant duplicated radio transmission. Various embodiments can also help improve communications within the network in order to meet KPIs of URLLC.

While many of the embodiments described herein are directed to an uplink transmissions from the URLLC UE, other embodiments may relate to downlink transmissions from the base station or another network entity to the URLLC UE.

A URLLC-serving network and/or a URLLC UE may select or reselect local serving cells, provided by corresponding serving base station, to form an optimized subset of a UE centric cell cluster in serving URLLC UE. The selection may be dynamic or proactive. The optimized subset may have the minimum number of local cells involved in serving URLLC UE so as to keep overhead, such as redundancy and energy consumption, as low as possible. In addition, certain embodiments may provide for network control for triggering URLLC UE specific measurement and reporting. Some embodiments may also provide for UE behavior and network management of an optimized serving subset of UE centric local cell cluster.

Certain embodiments are directed to radio transmission capabilities of a URLLC UE in a 5G UDN. The radio transmissions may include, for example, a millimeter-wave radio access technology system with beamforming. In one embodiments, parallel or simultaneous multiple radio transmissions/receptions may be provided in a MC environment between the URLLC UE and at least two cells of the serving subset. The parallel or simultaneous transmissions or receptions may be performed within the same TTI of 0.1 ms. The UE may be equipped with multiple transmission (Tx) or reception (Rx) chains between the UE and individual cells of the serving subset. The multiple Tx/Rx chains can help facilitate the simultaneous, parallel, or series communications between the UE and local cells in the subset. Tx/Rx chains may be at least partially independent, yet in some embodiments may be inter-related in the context of MC for URLLC.

In other embodiments, a UE may perform serial multiple radio transmissions or receptions in the MC environment. Each transmission or reception may be specific to one cell, and each transmission may occur in a TTI of 0.1 ms. The number of cells in the serving subset may be capped or restricted. In some embodiments, a maximum number of cells in the serving subset may be restricted directly by possible transmissions switched between cells within the uniform resource locator (URL) latency budget. For example, the maximum number of cells may be 5. This number is calculated based on the target user plane latency being 0.5 ms, and the TTI being 0.1 ms. Once a successful transmission or reception occurs, subsequent transmissions or receptions after the first successful transmission or reception may be skipped.

FIG. 1 illustrates beam switching in a 5G network. Specifically, FIG. 1 illustrates fast beam switching in a 5G millimeter-wave UDN involving base station 110 and a user equipment 120. The fast beam switching may be within one time slot of 100 microseconds, which can be used to minimize overhead.

In certain embodiments the URLLC UE may send each data packet to each cell of a subset of a local cell cluster once within 0.5 ms. The number of local cells to which the packet is sent may be determined according to a desired maximum packet error rate (PER). The number of cells needed in order to ensure KPIs of the URLLC may be based on, for example, performance of individual radio links towards individual serving cells in the subset.

In another example, the number of cells may be based on a possible error-correcting gain depending on the MDC scheme used. In some MDC schemes, self-decodable redundancy versions of the data packet may be used, and error-correcting gain may not be significant. Such an MDC scheme may be a simple and fast MDC scheme because there may be no need for collective higher layer acknowledgment (ACK) after MDC, but only duplication, detection, and discarding.

PER after MDC may be the product of PERs of the individual radio links toward the serving subset. For example, for a required KPI of $1\times10^{-6}$, if PER of individual radio links is $1\times10^{-1}$ (10%) then at least 6 local cells can be used to provide the required KPI. The number of local cells may be reduced to 3 if PER is changed to $1\times10^{-2}$ (1%).

Figure 2:
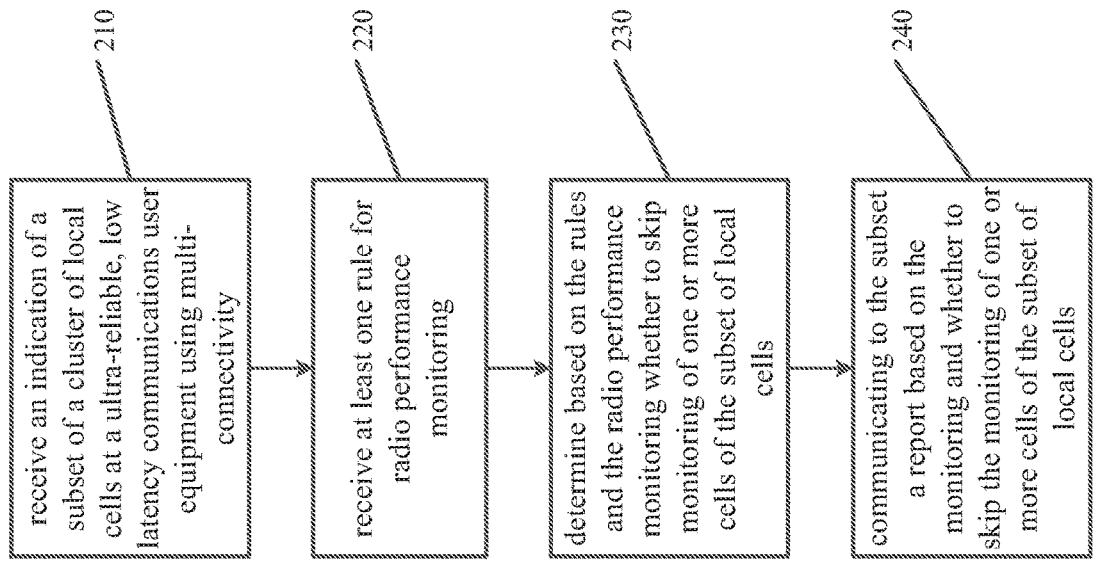
FIG. 2 illustrates a flow diagram according to certain embodiments.

FIG. 2 describes a flow diagram according to certain embodiments. In particular, FIG. 2 illustrates a communication between a URLLC UE and a subset of a cluster of local cells from the perspective of the UE. In step 210, the URLLC UE may receive an indication of a subset of a cluster of local cells using multi-connectivity. In step 220, the URLLC UE may receive at least one rule for a radio performance monitoring. The rules may include a packet error rate threshold configured for the user equipment per individual radio links of the multi-connectivity. For example, the packet error rate threshold may be a maximum threshold. In step 230, the UE may determine based on the rules and the radio performance monitoring whether to skip the monitoring of one or more cells of the subset of local cells. In certain embodiments, to skip the monitoring may include skipping the radio transmission and/or reception to/from one or more cells of the subset of local cells. The skipping may be short-term or long-term. In step 240, the UE may communicate with the subset based on the monitoring and whether to skip the monitoring of one or more cells of the subset of local cells. In certain embodiments the communication may be in the form of a plurality or multiple radio signals transmitted in MC to the subset of serving cells.

The signal may be sent to or received from multiple serving cells of the subset in parallel or simultaneously within the same time interval, for example the same TTI of 0.1 ms. In other embodiments, the signal may be a serial multiple radio transmission. Each signal may be sent to one cell per a TTI of 0.1 ms.

The network entity may configure the subset of the cluster of local cells. The subset may have a cap or an upper bound on the number of local cells in the subset. In other words, the network entity may configure a provisioned upper-bound number of local cells to serve the URLLC UE. The provisioned upper-bound number may be determined by the network to optimize the number of cells in the subset, while also ensuring that a sufficiently high number of local cells are available for providing URLLC.

In certain embodiments, the network entity may determine or set a PER threshold, such as a maximum threshold, on radio transmissions to and from the URLLC UE. The PER threshold may be determined for each individual cell or individual radio link. PER may be defined and monitored on different levels of the protocol stack, including any physical or logical layer. The threshold may also be the same or different for each individual cell. In some embodiments, the network may indicate the threshold to the UE using either common signaling, such as broadcast messages to all relevant UEs, or dedicated signaling, such as a unicast message dedicated to the targeted UE.

A maximum PER (max-PER), a PER between the maximum and the minimum (mid-PER), and minimum PER (min-PER) may be defined. These PER thresholds may be controlled by the network for the radio performance monitoring and operation of URLLC UE, in certain embodiments. Mid-PER and min-PER may be used for the short-term skip and/or the long-term skip.

As discussed above, in certain embodiments a network may configure a subset of cells and send an indication of the subset, as shown in step 210. The subset having an upper-bound and/or a corresponding maximum PER, as shown in step 220. An initial configuration may include either one set of configurations or multiple sets of configurations. In other words, there may be one or multiple upper-bound number of local cells or corresponding maximum PER. For example, the network may initially configure a subset of 6 local cells with a maximum PER equal to 10 percent for each cell. An additional configuration may also be provided in which a subset of 4 local cells with a corresponding maximum PER equal to 3 percent for each cell.

Certain embodiments may include a network controlled operation in which the network may initially explicitly configure the UE with a subset of cells, for example, cell #1, cell #2, . . . , cell #L, rather than as an integer of the upper-bound number. L may be the upper-bound number of cells. The network may then also determine the max-PER per each cell in the subset. In other embodiments, the UE may derive a common or equal max-PER value for each cell based on the number of cells in the subset, which will be equal to the upper-bound number and the PER requirement of URLLC service.

Certain embodiments that include multiple sets of initial configurations may also include rules for how the URLLC UE selects the proper configuration set. The rule may be based on, for example, the UE location, the UE's service requirements, UE traffic characteristics, and/or UE's capabilities. Other embodiments may include other rules that will provide the UE with sufficient information about which configuration to use. The network entity may determine the initial configuration based on, for example, corresponding radio performance metrics which are currently monitored by the cell for the overall cell performance, or some UE specific performance of a selected UE. The UE specific performance may be based on the UE's location. The network entity may use measurements or reports from the UE to determine the initial configuration.

In step 240, the URLLC UE may communicate with the subset based on monitoring and whether to skip the monitoring of one or more cells of the subset of local cells. Skipping may mean that radio transmissions and/or receptions to/from one or more cells of the subset of local cells may be skipped or suspended. The skipping may be short-term or long-term. In certain embodiments, the UE may report to the network entity a cell or a radio link on which PER exceeds the maximum PER. The network entity may be in charge of controlling the multi-connectivity of the user equipment. The network entity may be among the local cells in the subset in a distributed structure or one central unit or function, which is connected to and controlling the local cells as well as the UE in a centralized structure. Based on this report from the UE, a network entity may decide whether to replace that radio link and/or the serving cell. Alternatively, the network entity may determine to add a new one to the current subset.

In certain embodiments, the network entity may transmit to the URLLC UE one or more PER thresholds with respect to individual cells in the current subset. Depending on the number of cells in the current subset, the URLLC UE may use the PER threshold to determine whether to skip monitoring (receiving and/or transmitting from/to) a number of selected cells in the subset without notifying the network of its determination. In certain embodiments skip monitoring may mean to suspend transmissions and/or reception from/to one or more cells of the subset of local cells. While in some embodiment the URLLC UE may choose to notify the network of its determination to skip monitoring and/or transmitting, in other embodiments, the URLLC UE may determine to not notify or skip the notification of the network. The URLLC UE may still follow various configurations and rules controlled by the network.

The time duration for skipping monitoring (receiving and/or transmitting from/to) some selected cells in the subset may have a finite length. For example, when the current subset includes 6 cells, if the URLLC UE recognizes that the monitored PER on one or more radio links is below a preconfigured mid-PER of 5 percent, the URLLC UE may determine that a short-term skip on a per-TTI or per-packet transmission time-slot or sub-frame basis may be appropriate. Mid-PER may be a PER value between a min-PER and a max-PER.

The determination of which serving cells the UE should skip may be at least partially guided by rules provided by the network. In certain embodiments, the rules may be semi-statically preconfigured, while in other embodiment the rules may be dynamically configured and sent to the URLLC UE. When the radio performance of some cells in the currently configured serving subset meet URLLC requirements for the time being, it may not be needed, at least temporarily, to keep monitoring the rest of the configured subset. Therefore, the monitoring may be skipped in order to reduce or minimize redundancy.

The rules for skipping, for example, may be set to determine the number of cells to be skipped by the UE based on the monitored PER of the individual cells or radio links, while ensuring KPIs of ongoing URLLC are maintained for the UE. In some embodiments, if the monitored PER on a cell or radio link of the current serving subset, is below a certain threshold, for example, a mid-PER or a min-PER, then the cell may continue to be monitored, while the monitoring of some cells of the rest of the subset may be skipped for a predefined time duration. The skip may be a short-term skip. A short-term skip, for example, may be defined as skipping for the next TTI or the next packet.

The rules may be set to skip the cell with the largest PER, or the worst cell, which can be the cell having the lowest quality, such as achieving a max-PER. Alternatively, some embodiments may skip the cell with smallest PER or the best cell but only when the other cells in the subset are already enough to meet KPI of the URLLC. Such an embodiment may be used, for example, when the best cell happened to be the busiest cell and it may serve other users with at least equal priority. The best cell may be the cell with the lowest PER.

The rules may be set to constrain the maximum number of cells the UE may skip. In addition, the rules may determine to skip monitoring based on the resource/energy usage in order to achieve the target PER. For example, the rules may include skipping the cell with the most number of physical resource blocks and/or the largest transmission power used.

In certain embodiments, the URLLC UE may recognize that the monitored PER of a cell is below yet another preconfigured PER, referred to as the minimum PER, such as a minimum PER equal to 1 percent. The length of the predefined time duration for skipping monitoring one or more selected cells may be longer or more than a TTI in the short-term skip and, therefore, referred to as long-term skip. In some embodiments, the long-term skip may be a per system frame, for example, 1 ms, 10 ms, or multiple thereof. In another example, the long-term skip may be on a multiple TTI or system-frame basis.

Certain embodiments may have a maximum number of cells that the URLLC UE may skip when a certain condition is met. The condition may depend on the number of cells in the current subset, and may be monitored for when the PER of a monitored cell is below mid-PER or the minimum PER. In other embodiments, the rules or conditions may allow the UE to skip monitoring of up to a preconfigured number of other cells of the current serving subset, for each cell on which the monitored PER is below the minimum PER.

The UE may, for example, not use a long-term skip when the current subset is small enough, for example having no more than 3 local cells. In other embodiments, the UE may not skip at all when the current subset includes a small number of cells, for example, the minimum two local cells. The network may configure the URLLC UE to notify the network of a determined long-term skip. In some other embodiments, the UE may be configured not to notify the network of the long-term skip.

In certain embodiments, the network may determine to reconfigure the subset. Reconfiguration may include adding or replacing cells and/or radio links, as well as changing rules or thresholds related to the subset. The reconfiguration may be based on the network's monitoring of PER performance per individual cell of the current subset, and/or reports or notifications received from the URLLC UE. In certain embodiments, the network may also reconfigure the related thresholds and rules in relation to, or in dependence of, the number of cells in a subset, as well as the performance of individual cells in the subset.

While many of the above embodiments focused on parallel or simultaneous multiple radio transmissions, certain embodiments may include serial multiple radio transmissions or receptions in MC. A single radio transmission or reception may be made to each cell per a TTI of 0.1 ms. The serial multiple radio transmissions or receptions may allow the URLLC UE and the serving subset to use the radio link or cell that successfully transmits or receives information first. This embodiment can help to ensure that the packet is transmitted or received successfully as soon as possible, and skip all the subsequent transmissions or receptions.

In certain embodiments, a dynamic prioritization or ordering of the cells or radio link may be determined. In some embodiments, the network may prioritize or order individual cells in the subset for the uplink and/or downlink. In one example, a cell may have high priority for uplink but lower priority for downlink. The prioritizing or ordering of local cells for the communications between the user equipment and local cells in the subset may be controlled and/or reconfigured based on monitoring PER performance of individual radio links. This ordering may be based on explicit signaling or preconfigured rules for self-configuration.

The configured order of the individual cells for transmission may be used in different ways. The use of the configured order of the cells may depend on how fast an acknowledgement (ACK) or a negative-acknowledgement (NACK) can be made available to the network entity. ACK or NACK may indicate the successful or unsuccessful transmission or reception of data by a UE, a cell, or a serving base station. In certain embodiments, ACK/NACK feedback of each transmission may be available before the start of the next transmission to the next cell. The transmission order to the individual cells may follow the configured prioritization/ordering of the individual cells.

Once ACK is received by the network, the attempted transmission of that packet may stop. For example, initially the network may configure a subset of 4 local serving cells for the URLLC UE with the ordering numbers of 1, 2, 3, 4. The URLLC UE may then start transmission or reception of the packet in the cell 1, and switch to cell 2 if the transmission or reception in cell 1 is not successful. If cell 2 is also unsuccessful, the URLLC UE may switch to cells 3 and 4, respectively, until the UE is able to find a cell to transmit or receive a packet.

When ACK/NACK feedback for each transmission may not be available in time before the transmission to the next cell begins, URLLC UE may determine how many cells in the serving subset it may need to transmit the given packet. The determination may be made based on a configured PER threshold, as discussed above. The prioritization or ordering of cells can also be used to select the individual cells to which the UE may transmit.

For both cases, in which the ACK/NACK feedback for each transmission may be available or may not be available in time before the next transmission, the UE and the subset may utilize a rule that dictates that the first cell having a successful transmission can replace cell 1 in the current subset, and the order or priority of the cell that fails may change accordingly. Those cells which are skipped after the successful transmission or reception may have their ordering numbers shifted up. For example, a UE may unsuccessfully attempt to transmit a packet in cell 1. The packet may then be successfully retransmitted or transmitted next in cell 2. For the next packet or data transmission, the first cell may now be the current cell 2, while the second and third cells may be the current cell 3 and current cell 4. The fourth cell may be the current cell 1, in which the UE unsuccessfully attempted to transmit the packet. The network entity may coordinate the updating of the orders of the cell, and may signal the order updates to the remaining cells.

In certain embodiments, the above reordering of the cells may be avoided if the reordering is limited to those cells which are actually involved in success or failure of the transmission of the packet. In other words, the ordering may only involve part of the cells in the subset, rather than reordering all of the cells. For example, if cell 1 fails to transmit a packet, but cell 2 is successful, the order of cell 1 and cell 2 may be swapped, while cells 3 and 4 are kept the same.

The preconfigured rules may be expanded so that an unused cell for a certain preconfigured time may be removed from the serving subset. In some embodiments there may be at least one unused cell in each subset. If all the cells in the current subset need to be involved in transmissions or receptions of the last N consecutive packets, then the network entity may determine to add a new cell to the subset. N may be the number of transmitted or received packets, determined and configured by the network.

The above embodiments allow the network to optimize a serving subset of local UE centric cell clusters. The network may also be configured to select just enough local cells in the current subset to monitor for transmissions or receptions. The embodiments can help reduce overhead and energy consumption for URLLC UE or that of any network entity.

In certain embodiments, parallel or simultaneous multiple radio transmissions/receptions may be performed in a MC environment between the URLLC UE and at least two cells of the serving subset. The parallel or simultaneous transmissions or receptions may be performed within the same TTI of 0.1 ms. In order to allow both the UE side and the network side to monitor PER performance of individual data or radio links in MC, in certain embodiments, L1 ACK/NACK may be applied for L1 transmissions of URLLC UE on individual data radio links ACK/NACK and PER monitoring based on ACK/NACK may depend on whether the scheme is used in DL or UL, on the transmitter side or the receiver side, or the time duration or length of skipping of the monitoring, for example, short-term skip or long-term skip, or any combination thereof. In some other embodiments, the ACK/NACK and PER monitoring may be adaptable depending at least on some of the above listed factors.

In certain embodiments, the ACK/NACK and the PER monitoring based on ACK/NACK may not be included. For example, ACK/NACK may not be included when short-term and/or long-term skipping occurs for the receiving side only. The receiving side may then explicitly report the monitored PER to the transmitting side.

L1 ACK/NACK may help URLLC UE to monitor PER, on the transmitting side in UL. Based on monitoring of the PER, the UE may determine the short-term skip of UL transmissions. For long-term skip, on the other hand, the URLLC UE may base its decision on PER provided to it by the network. The network may also configure a long-term skip for URLLC UE. In certain embodiments, URLLC may have at least one successful transmission among MCs, and no retransmission on individual radio links. In such embodiments it may be sufficient to send only L1 NACK, rather than L1 ACK.

In certain embodiments, the short term and/or long-term skipping may be used at both the transmitting side and the receiving side. In such an embodiment, there is a need for synchronization of both sides, such as the UE and the network entity. In some embodiments an independent random selection of the cells for skipping may be utilize. In other embodiments, instead of random selection a deterministic selection rule or explicit signaling procedure for synchronization of the skipping may be predetermined or preconfigured.

Explicit signaling procedures may cause additional delay, and therefore may be used with long-term skip. In addition to an explicit indication or confirmation handshaking between the transmitting and receiving sides, a short command, for example fast L1 or MAC signaling, may be used. The short command may include a request to continue or extend the current long-term skip time duration into the next long-term skip time duration. After a long enough time duration of M consecutive longer-term time durations, a reconfiguration may be triggered, for example, to reconfigure the serving subset or cluster. M may be a number of consecutive longer-term time durations after which reconfiguration may be triggered.

In certain embodiments, it may be considered that an individual serving cell schedules UL transmissions and DL receptions for the URLLC UE per TTI, as used in the current LTE Evolved Universal Terrestrial Access Network (E-UTRAN) for mobile broadband services. In such an embodiment, the scheduled grant of the UE may send on a physical DL control channel an ACK/NACK, command to skip transmission and/or reception, or to extend and/or stop the skipping.

It certain embodiments, when considering UL and DL separately, the following operations may be included. For example, in a downlink reception operation, a UE may determine to skip receiving DL transmission from some cell based on network configured rules and monitored PER of each link. Regardless of the determination of the UE the network entity, for example a serving base station, may transmit on a DL channel to the UE. In a downlink transmission operation, the base station may determine to skip transmitting DL in some cell, and inform the UE using DL scheduling grant or higher layer signaling.

In an uplink transmission operation, the UE may determine to skip transmitting in some cell. Similarly, in an uplink reception operation, the network entity may determine to skip receiving UL transmissions from some cells based on monitored PER, and use UL scheduling grant to inform the UE to skip at least one transmission.

In certain embodiments, it may be possible to configure some skipping pattern based on PER monitoring of each cell or radio link of the serving subset. For example, the skipping pattern may specify a pattern of selected cells for subsequent short-term or long-term skips. The initiating side of the transmission may quickly inform the other side of the start of the skipping pattern, and both the transmitting and receiving sides can follow the skipping pattern for the efficient monitoring of targeted cells.

Certain embodiments may include serial multiple radio transmissions or receptions in MC. Each transmission or reception may be specific to one cell for each TTI of 0.1 ms. In certain embodiments, only L1 NACK may be needed for the network to determine a configuration for the next transmission, rather than L1 ACK. Certain embodiments may maintain MC between URLLC UE and the serving subset with regard to each individual cell or network entity in the serving subset. Even when cells with a lower ordering number may not need to be involved in the serving the URLLC UE, the network may still configure the URLLC UE so that unused cells that may not be involved in the serving of the UE can still maintain the corresponding radio or radio links.

Maintaining radio links in unused cells may be realized by, for example, regular measurement, reporting, and/or redundant transmission or reception, in addition to or in combination with that of the selected cell with highest ordering number. For example, assuming that it takes 3 times the TTI (0.3 ms) to get ACK/NACK, and URLLC UE may transmit the packet to two cells out of the serving subset of cells 1-4. The URLLC UL may then transmit the packet to cell 1 and cell 3 in the first two TTIs, and if retransmission is warranted, the UE may retransmit using cells 2 and 4.

Figure 3:
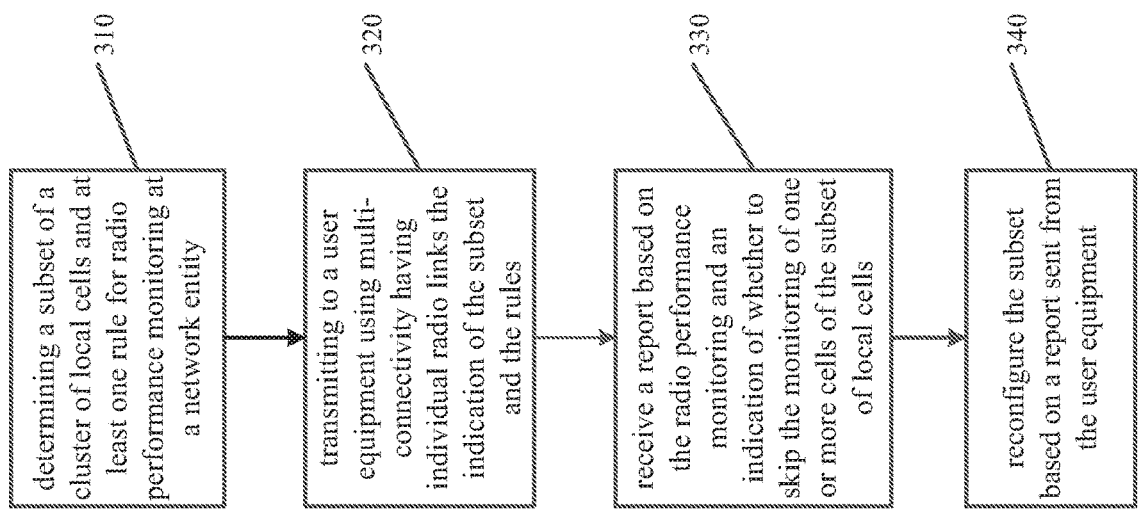
FIG. 3 illustrates a flow diagram according to certain embodiments.

FIG. 3 illustrates a flow diagram according to certain embodiments. In step 310, a network entity may determine a subset of a cluster of local cells and at least one rule for radio performance monitoring. The at least one rule may include a packet error rate threshold for individual radio links. In step 320, the network entity may transmit to an ultra-reliable, low latency communications user equipment using multi-connectivity having individual radio links the indication of the subset and the rules. The UE may then use the indication and the PER to communicate with the subset. In addition, as discussed above, the network entity may reconfigure the subset based on a response message sent from the UE. The network entity may also determine to skip a UL transmission from some cell based on information received from the UE, or based on self-monitoring by the network.

In step 330, the network entity may receive a report based on the radio performance monitoring and an indication of whether to skip the monitoring of one or more cells of the subset of local cells. In certain embodiments, skipping the monitoring may include skipping the radio transmission and/or reception to/from one or more cells of the subset of local cells. The skipping may be either short-term or long-term. In step 340, the network entity may reconfigure the subset based on a report sent from the user equipment.

FIG. 4 illustrates a system according to certain embodiments. It should be understood that each signal or block in FIGS. 2 and 3 may be implemented by various means or their combinations, such as hardware, software, firmware, one or more processors and/or circuitry. In one embodiment, a system may include several devices, such as, for example, network entity 420 or UE 410. The system may include more than one UE 410 and more one network node 420, although only one access node shown for the purposes of illustration. The network entity may also be a network node, access node, a base station, a SGNB, an eNB, server, host, or any of the other access or network node discussed herein.

Each of these devices may include at least one processor or control unit or module, respectively indicated as 411 and 421. At least one memory may be provided in each device, and indicated as 412 and 422, respectively. The memory may include computer program instructions or computer code contained therein. One or more transceiver 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, network entity 420 and UE 410 may be additionally configured for wired communication, in addition to wireless communication, and in such a case antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 410 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter. While in certain embodiments the UE is described as being a URLLC UE, the UE may be compatible with any other current or future network technology.

In some embodiments, an apparatus, such as a network entity, may include means for carrying out embodiments described above in relation to FIGS. 2 and 3. In certain embodiments, at least one memory including computer program code can be configured to, with the at least one processor, cause the apparatus at least to perform any of the processes described herein.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 420 or UE 410, to perform any of the processes described above (see, for example, FIGS. 2 and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 4 illustrates a system including a network entity 420 and UE 410, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 410 may likewise be provided with a variety of configurations for communication other than communication network entity 420. For example, the UE 410 may be configured for device-to-device communication.

Certain embodiments can provide a method, apparatus, means for, or a computer product for managing a subset of a cluster of serving cells for a URLLC UE. The management process discussed above may help to improve the efficiency of the URLLC UE, and ensure that resource consumption, such as radio spectrum or power energy, for both the network and UE sides can be minimized Such embodiments can also help improve communications within the network in order to meet various KPIs of URLLC. In addition, some embodiments allow for two different use cases, one in which parallel or simultaneous multiple radio transmissions are made from a UE to a subset of serving cells, and another in which serial transmissions are made to each cell in a TTI.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

| Partial Glossary | |
|---|---|
| 3GPP | Third Generation Partnership Project |
| ACK | Positive Acknowledgment |
| URLLC | Ultra, Reliable Low Latency Communications |
| KPI | Key Performance Indicator |
| SDU | Service Data Unit |
| NACK | Negative Acknowledgement |
| DRX | Discontinuous Reception |
| TTI | Transmission Time Interval |
| RRT | Roundtrip Time |
| MC | Multi-Connectivity |
| UDN | Ultra-density Network |
| MDC | Macro-diversity Combining |
| PER | Packet Error Rate |
| NACK | Negative Acknowledgment |
| UE | User Equipment |

We claim:

1. A method comprising:
   receiving an indication of a subset of a cluster of local cells at an ultra-reliable, low latency communications user equipment using multi-connectivity;
   receiving at least one rule for radio performance monitoring, wherein the at least one rule includes a packet error rate threshold for individual radio links of the multi-connectivity;
   determining based on the at least one rule and the radio performance monitoring whether to skip monitoring of one or more cells of the subset of local cells, wherein the skip may be a short-term skip or a long-term skip; and
   communicating to a network entity an indication of whether to skip monitoring of one of more cells of the subset of local cells and a report based on the radio performance monitoring.

2. The method according to claim 1, wherein a number of the local cells in the subset is capped.

3. The method according to claim 1, wherein the skipping of monitoring of one or more cells of the subset of local cells is to skip a transmission or reception to or from a cell in the subset.

4. The method according to claim 1, further comprising:
   reporting to a network entity that a maximum packet error rate has been exceeded, wherein the network entity is in charge of controlling the multi-connectivity of the user equipment.

5. The method according to claim 1, wherein one or more of the performance error rate threshold is configured to the user equipment per individual radio link of the multi-connectivity.

6. The method according to claim 1, wherein the user equipment refrains from informing a network entity when the user equipment determines to skip the monitoring of one or more cells.

7. The method according to claim 1, wherein the short-term skip or long-term skip is predetermined or determined based on a transmission time interval.

8. The method according to claim 1, wherein a number of the one or more cells in the subset that are skipped is capped, and the number is capped based on a number of local cells in the subset.

9. The method according to claim 1, wherein prioritized or ordered local cells for the communications between the user equipment and local cells in the subset are determined based on the radio performance monitoring of individual radio links.

10. A method comprising:
    determining at a network entity a subset of a cluster of local cells and at least one rule for radio performance monitoring, wherein the at least one rule includes a packet error rate threshold for individual radio links;
    transmitting the indication of the subset and the at least one rule to an ultra-reliable, low latency communications user equipment using multi-connectivity having individual radio links;
    receiving an indication of whether to skip monitoring one or more cells of the subset of local cells and a report based on the radio performance monitoring, wherein the skip may be short-term or long-term; and
    reconfiguring the subset based on the report sent from the user equipment.

11. The method according to claim 10, wherein the network entity determines whether to skip monitoring one or more cells of the subset of local cells, and wherein the determination is based on the report received from the user equipment, or based on monitoring conducted by the network entity.

12. The method according to claim 10, wherein a number of the local cells in the subset is capped.

13. The method according to claim 10, wherein the skipping of monitoring of one or more cells of the subset of local cells is to skip a transmission or reception to or from the skipped one or more cells in the subset.

14. The method according to claim 10, wherein one or more of the performance error rate threshold is configured to the user equipment per individual radio link of the multi-connectivity.

15. The method according to claim 10, wherein the short-term skip or long-term skip is predetermined or determined based on a transmission time interval.

16. An apparatus comprising:
    at least one processor; and
    at least one memory including computer program code,
    wherein the at least one memory and the computer program code are configured to, with the at least one processor, cause the apparatus at least to receive an indication of a subset of a cluster of local cells at an ultra-reliable, low latency communications user equipment using multi-connectivity;
    receive at least one rule for radio performance monitoring, wherein the at least one rule includes a packet error rate threshold for individual radio links of the multi-connectivity;
    determine based on the at least one rule and the radio performance monitoring whether to skip monitoring of one or more cells of the subset of local cells, wherein the skip may be a short-term skip or a long-term skip; and
    communicate to a network entity an indication of whether to skip monitoring of one of more cells of the subset of local cells and a report based on the radio performance monitoring.

17. The apparatus according to claim 16, wherein the at least one memory and the computer program code are configured to, with the at least one processor, cause the apparatus further to:
    report to a network entity that a maximum packet error rate has been exceeded, wherein the network entity is in charge of controlling the multi-connectivity of the user equipment.

18. The apparatus according to claim 16, wherein one or more of the performance error rate threshold is configured to the user equipment per individual radio link of the multi-connectivity.

19. The apparatus according to claim 16, wherein a number of the one or more cells in the subset that are skipped is capped, and the number is capped based on a number of local cells in the subset.

20. The apparatus according to claim 16, wherein prioritized or ordered local cells for the communications between the user equipment and local cells in the subset are determined based on the radio performance monitoring of individual radio links.

* * * * *